United States Patent
Saltsman (10) Patent No.: US 7,738,087 B1
(45) Date of Patent: Jun. 15, 2010

(54) STEREOSCOPIC TARGETING, TRACKING AND NAVIGATION DEVICE, SYSTEM AND METHOD

(76) Inventor: Joseph C. Saltsman, 1671 Vt Rt 111, Derby, VT (US) 05829

( * ) Notice: Subject to any disclaimer, the term of this patent is extended or adjusted under 35 U.S.C. 154(b) by 0 days.

(21) Appl. No.: 12/245,756

(22) Filed: Oct. 5, 2008

Related U.S. Application Data (63) Continuation of application No. 11/161,044, filed on Jul. 20, 2005, now Pat. No. 7,433,021.

(60) Provisional application No. 60/522,068, filed on Aug. 10, 2004.

(51) Int. Cl.
*G01B 11/26* (2006.01)
(52) U.S. Cl. .................................................. 356/139
(58) Field of Classification Search .................. 356/139
See application file for complete search history.

(56) References Cited

U.S. PATENT DOCUMENTS

| | | | |
|---|---|---|---|
| 4,516,851 A | 5/1985 | Parker et al. | |
| 4,622,458 A | 11/1986 | Boeck et al. | |
| 4,671,650 A | 6/1987 | Hirzel et al. | |
| 4,780,719 A | 10/1988 | Frei et al. | |
| 4,834,531 A * | 5/1989 | Ward | 356/5.08 |
| 4,957,369 A * | 9/1990 | Antonsson | 356/608 |
| 5,198,607 A | 3/1993 | Livingston et al. | |
| 5,351,056 A | 9/1994 | Sawyer | |
| 5,386,370 A | 1/1995 | Woo | |
| 5,586,063 A | 12/1996 | Hardin | |
| 5,631,654 A | 5/1997 | Karr | |
| 5,642,299 A | 6/1997 | Hardin et al. | |
| 5,812,247 A | 9/1998 | Meyer | |
| 6,043,867 A | 3/2000 | Saban | |
| 6,498,580 B1 | 12/2002 | Bradford | |
| 6,527,222 B1 | 3/2003 | Redano | |
| 6,666,401 B1 | 12/2003 | Mardirossian | |
| 6,675,121 B1 | 1/2004 | Hardin | |
| 6,873,406 B1 * | 3/2005 | Hines et al. | 356/141.1 |
| 7,433,021 B2 | 10/2008 | Saltsman | |
| 2007/0002304 A1 | 1/2007 | Saltsman | |

* cited by examiner

*Primary Examiner*—Thomas H Tarcza
*Assistant Examiner*—Luke D Ratcliffe
(74) *Attorney, Agent, or Firm*—Jay R. Yablon (57) ABSTRACT

A measurement system with a minimum of 2 sensors that identifies precise locations of remote objects. The sensors measure the elevation and azimuth angles to the target using the electro-magnetic radiation that is either intentionally or incidentally reflected off of the object. Given the known distance between the sensors, the system are able to calculate the exact X-Y-Z coordinates of the object using a modified type of triangulation. In the case of moving targets, this data is used to determine target origin and destination. In the case of stationary targets, the data is used to determine exact location of target and for navigation to or around the stationary target.

28 Claims, 10 Drawing Sheets

STEREOSCOPIC TARGETING, TRACKING AND NAVIGATION DEVICE, SYSTEM AND METHOD

CROSS-REFERENCE TO RELATED APPLICATIONS

This application is a continuation of pending U.S. application Ser. No. 11/161,044 filed Jul. 20, 2005, now U.S. Pat. No. 7,433,021 issued Oct. 7, 2008, which in turn claims benefit of provisional U.S. application 60/522,068 filed Aug. 10, 2004, now expired.

FIELD OF THE INVENTION

The present invention relates to targeting and navigation systems and, more particularly, to triangulation-type targeting and navigating.

BACKGROUND OF THE INVENTION

U.S. soldiers under mortar or missile attack do not have an effective method of determining the origin of the attack. Usually, it is too late by the time the source of the attack has been located.

It would be desirable to be able to track incoming ordnance, e.g., missiles and mortar, and reverse interpolate where these ordnance originated. Presently, radar cannot track small objects like these.

It is also desirable to be able to determine the destination of airborne objects in real time as well as enabling automated navigation for vehicles, planes and robotic vehicles.

Presently, there are no known systems designed to track and reverse interpolate the origin of incoming ordinance. U.S. Pat. No. 3,937,951 uses two sensors to determine the location of a lightning event. This device is only capable of determining the average location of the lightning event.

If this device were to be used for tracking incoming ordnance, it would not have the accuracy and resolution required to be able to pinpoint the ordnance trajectory.

It is therefore desirable to store real-time trajectory data to be used to predict target destination and calculate target origin.

It is also desirable to measure the exact location of stationary objects for navigation and surveying.

SUMMARY OF THE INVENTION

Disclosed herein is a measurement system with at least 2 sensors to identify precise locations of remote objects. The sensors detect electro-magnetic radiation which is either emitted from or reflected off of the object, and measures the elevation and azimuth angles to the target. Given a known distance between the 2 sensors, the system is then able to calculate the exact location of the object using a modified type of triangulation. In the case of moving targets, this data is used to determine target trajectory, origin and destination. In the case of stationary targets, the data is used to determine the exact location of the target for mapping and for navigation to or around the stationary target.

In particular, disclosed herein is a sensor system for tracking and navigation, comprising: two sensors, each sensor comprising a two-dimensional plurality of discrete detection pixels; for each sensor, computerized data associating each detection pixel thereof with a predetermined azimuth angle and a predetermined elevation angle; computerized means for automatically determining azimuth angles and elevation angles of a target or beacon simultaneously detected by each of the sensors, for each of the sensors, based on the computerized data; and computerized means for calculating a three-dimensional position of the target or beacon, based on the azimuth angles and the elevation angles of the target or beacon for each of the sensors, and based on a known distance and relative orientation between each of the sensors.

Further disclosed is a computerized device and related method for use in connection with a sensor system for tracking and navigation, comprising computerized input, storage and processing means for: receiving input data specifying a detection pixel of a sensor which has detected a target or beacon; storing computerized data associating each detection pixel with a predetermined azimuth angle and a predetermined elevation angle; and determining an azimuth angle and an elevation angle of the detected target or beacon from the input data in association with the stored computerized data.

Further disclosed is a method and related apparatus for calibrating a sensor for tracking and navigation, comprising the steps of: striking the sensor with calibration electromagnetic radiation originating at known azimuth and elevation angles; determining which detection pixels of the sensor are activated by the calibration electromagnetic radiation; and associating the activated detection pixels with the known azimuth and elevation angles.

Further disclosed is a sensor system and related method for tracking and navigation, comprising: a sensor comprising a two-dimensional plurality of discrete detection pixels; and computerized data associating each the detection pixel with a predetermined azimuth angle and a predetermined elevation angle; wherein: when a target or beacon is detected by a given pixel of the sensor, an azimuth angle and an elevation angle of the target or beacon is automatically determined from the computerized data.

BRIEF DESCRIPTION OF THE DRAWINGS

The features of the invention believed to be novel are set forth in the appended claims. The invention, however, together with further objects and advantages thereof, may best be understood by reference to the following description taken in conjunction with the accompanying drawing(s) in which:

DETAILED DESCRIPTION

Figure 1:
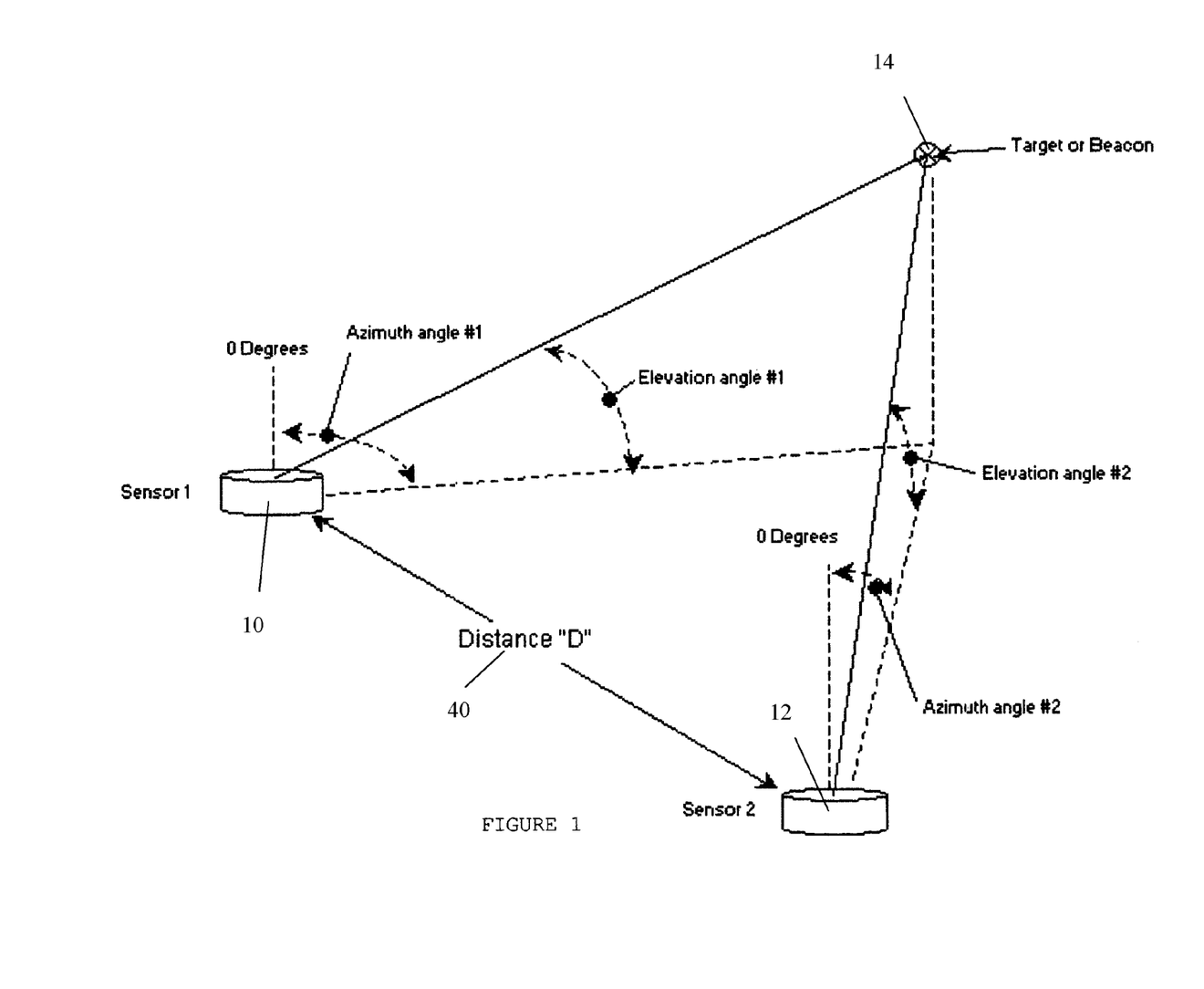
FIG. 1 is a side view of a simplified two-sensor arrangement with key measurement parameters.

FIG. 1 is a perspective side view of a simplified sensor arrangement with key measurement parameters. In this basic, simplified configuration, a minimum of two sensors (left (first) sensor 10, right (second) sensor 12) are located in the same horizontal plane. Both sensors are aligned such that their 0 degree azimuth directions (i.e. north) are congruent and they are each leveled with the sensing lens facing up to the sky. Once this alignment and leveling is finished, the distance between the sensors must be established. This may be done physically with, e.g., compasses, bubble levels, and sighting eyepieces. However, this process may also be simplified using a preferred sensor to be later described which comprises additional electronics to automate this process and allow for significant variation from this basic configuration. The upshot, however, is that the distance and relative orientation between each of the sensors needs to be known before the system can be effectively utilized for tracking or navigation.

Once the distance and relative orientation between each of the sensors is known, the sensors 10 and 12 (for a two-sensor system) are used to detect electromagnetic radiation from a moving target or beacon 14 located in the sky or on the ground. For use at night, one may employ infra-red or ultra-violet sensors. As will be elaborated in detail below, each sensor in the system is able to independently determine the azimuth angle and the elevation angle to the target or beacon 14. Given the initial conditions of azimuth angles A1, A2, elevation angles E1, E2, and Distance "D" 40 the system processor is able to calculate the exact location of the target using the following trigonometric calculations with right sensor 12 defined as the system origin.

Figure 7:
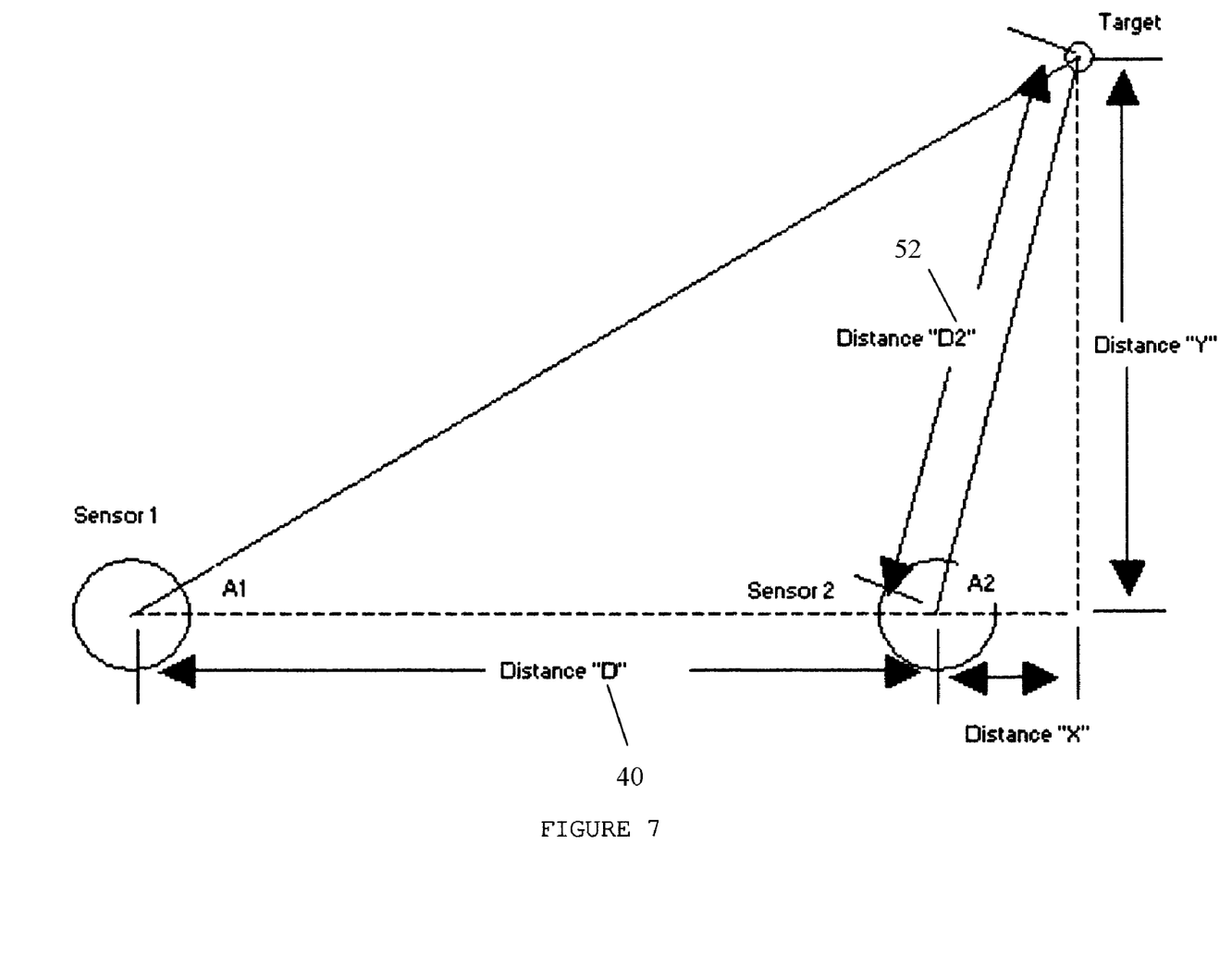
FIG. 7 is a perspective top view of a target in view of a two sensor array.

Using FIG. 7 as a top view of a target in the sensor area, one can, for example, derive the following equations:

$$\text{Tan } A1 = Y/(D+X) \tag{1}$$

$$\text{Tan } A2 = Y/X \tag{2}$$

In the equation (2) above, solving for X yields:

$$X = Y/\text{Tan } A2 \tag{3}$$

Substituting equation (3) into equation (1) yields:

$$\text{Tan } A1 = Y/(D+(Y/\text{Tan } A2)) \tag{4}$$

Solving for Y in equation (4) yields:

$$Y = (\text{Tan } A1 * D)/(1-(\text{Tan } A1/\text{Tan } A2)) \tag{5}$$

Next, solving equation (2) for Y yields:

$$Y = X * \text{Tan } A2 \tag{6}$$

Substituting equation (6) into equation (1) by replacing Y yields:

$$\text{Tan } A1 = (X * \text{Tan } A2)/(D \pm X) \tag{7}$$

Solving equation (7) for X yields the equation:

$$X = (\text{Tan } A1 * D)/(\text{Tan } A2 - \text{Tan } A1) \tag{8}$$

Next, calculating D2 52 using the Pythagorean theorem yields:

$$D2^2 = X^2 + Y^2 \tag{9}$$

and the square root each side yields:

$$D2 = \text{Sqrt}(X^2 + Y^2) \tag{10}$$

Figure 8:
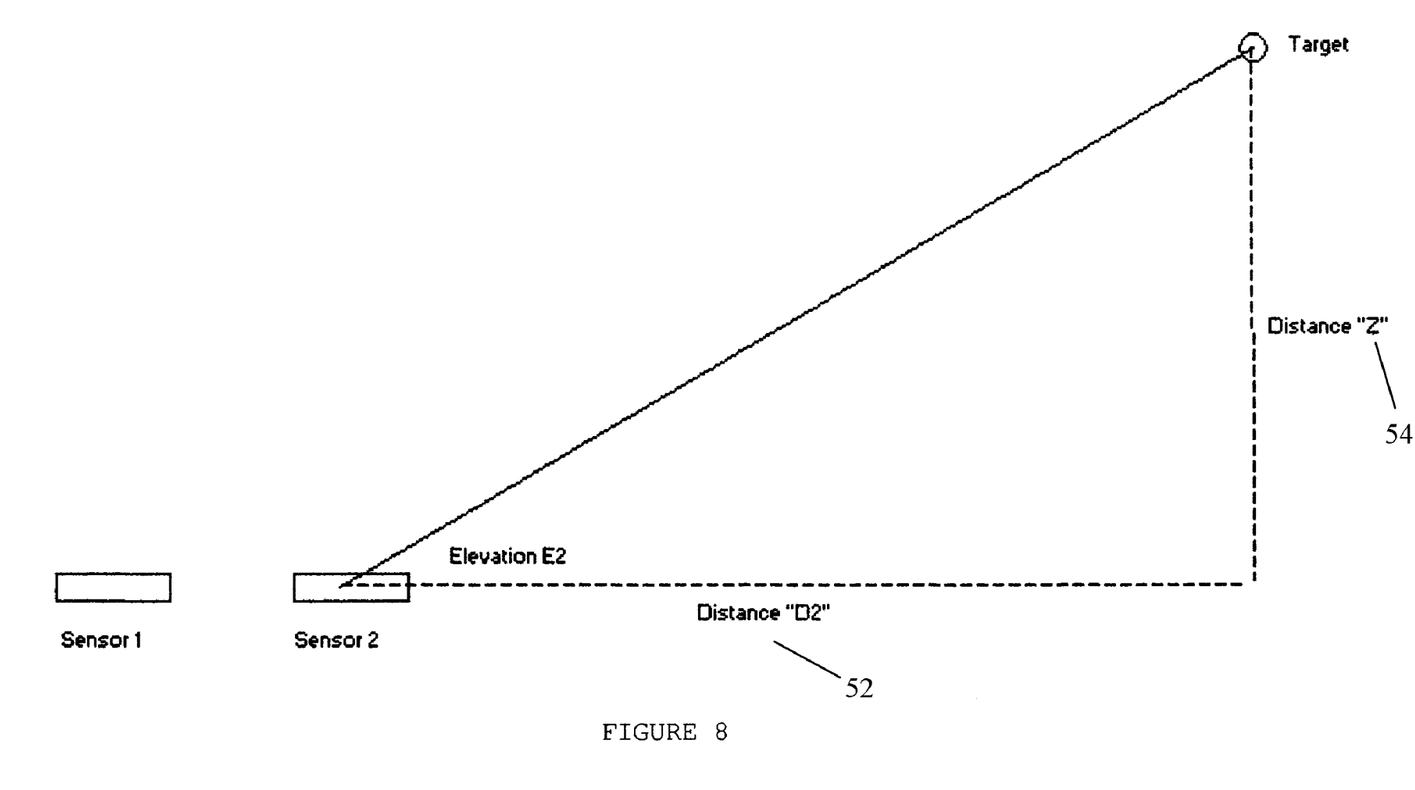
FIG. 8 is an orthogonal view of a right triangle formed by elevation angle E2 and hypotenuse D2.

FIG. 8 is an orthogonal view of the right triangle formed by elevation E2 and hypotenuse D2 52.

This configuration yields the equation:

$$\text{Tan } E2 = Z/D2 \tag{11}$$

Solving for Height "Z" 54 yields:

$$Z = \text{Tan } E2/D2 \tag{12}$$

Once these X-Y-Z coordinates have been obtained from equations (5), (8) and (12), this process can be reiterated as often as necessary until the target exits the sensors' view, thus providing the basis as well for velocity and trajectory calculations. The data may be represented in the X-Y-Z location coordinates derived above, or in any other suitable coordinate system. The data may also be converted into GPS data if system was initially calibrated with GPS. The trajectory data points obtained can be utilized in a number of ways.

These coordinates may be used directly for surveying. For example, this system could be used to measure distance to the top of a mountain or building if, for example, one points a laser on the mountain or building, and then detects the X-Y-Z coordinate of the laser point.

A series of coordinates with time separation data may be input to a computerized device with suitable hardware, software and storage for calculating a "best fit" trajectory in order to reverse-interpolate the origin of the target. Similarly, series of coordinates with time separation data may be input to a computerized device with suitable hardware, software and storage for calculating a "best fit" trajectory in order to forward-interpolate the destination of the target. That is, it is possible to calculate an origin and/or destination of the target based on the above calculation of three-dimensional position at least two distinct times.

If left sensor 10 and right sensor 12 are attached to a mobile vehicle and the target or beacon 14 is stationary, the data can be used for navigation.

If both target and vehicle sensors are moving, data can be processed to determine continuous relative position between target and vehicle.

Figure 2:
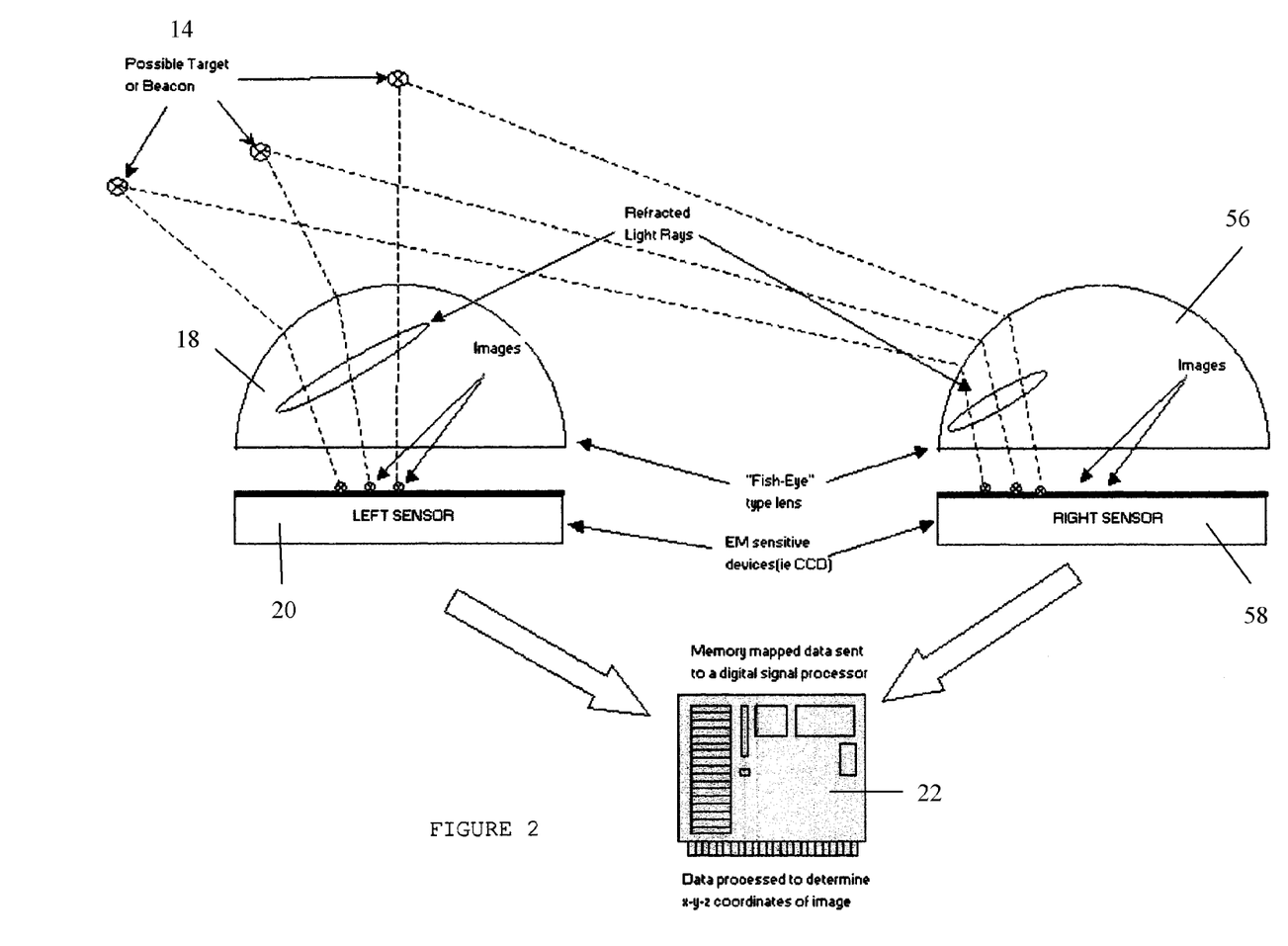
FIG. 2 is a cross sectional view of a two-sensor system.

FIG. 2 is a cross sectional view of one of the sensors. Target/beacon locations are shown in the sensor's field of view. The target or beacon 14 image is refracted by the fish eye lens on the left side 18 onto a left-side image sensor 20. Left-side image sensor 20 converts the light data into memory mapped pixel computer data which is sent to the digital computer 22 memory. Here, the computer converts the pixel data into angles of azimuth and elevation. The same occurs for a right-side image sensor 58. Subsequently, X-Y-Z coordinate data (or data in another suitable coordinate representation) is calculated using the angles and distance "D" 40 as described in the above equations.

Figure 3:
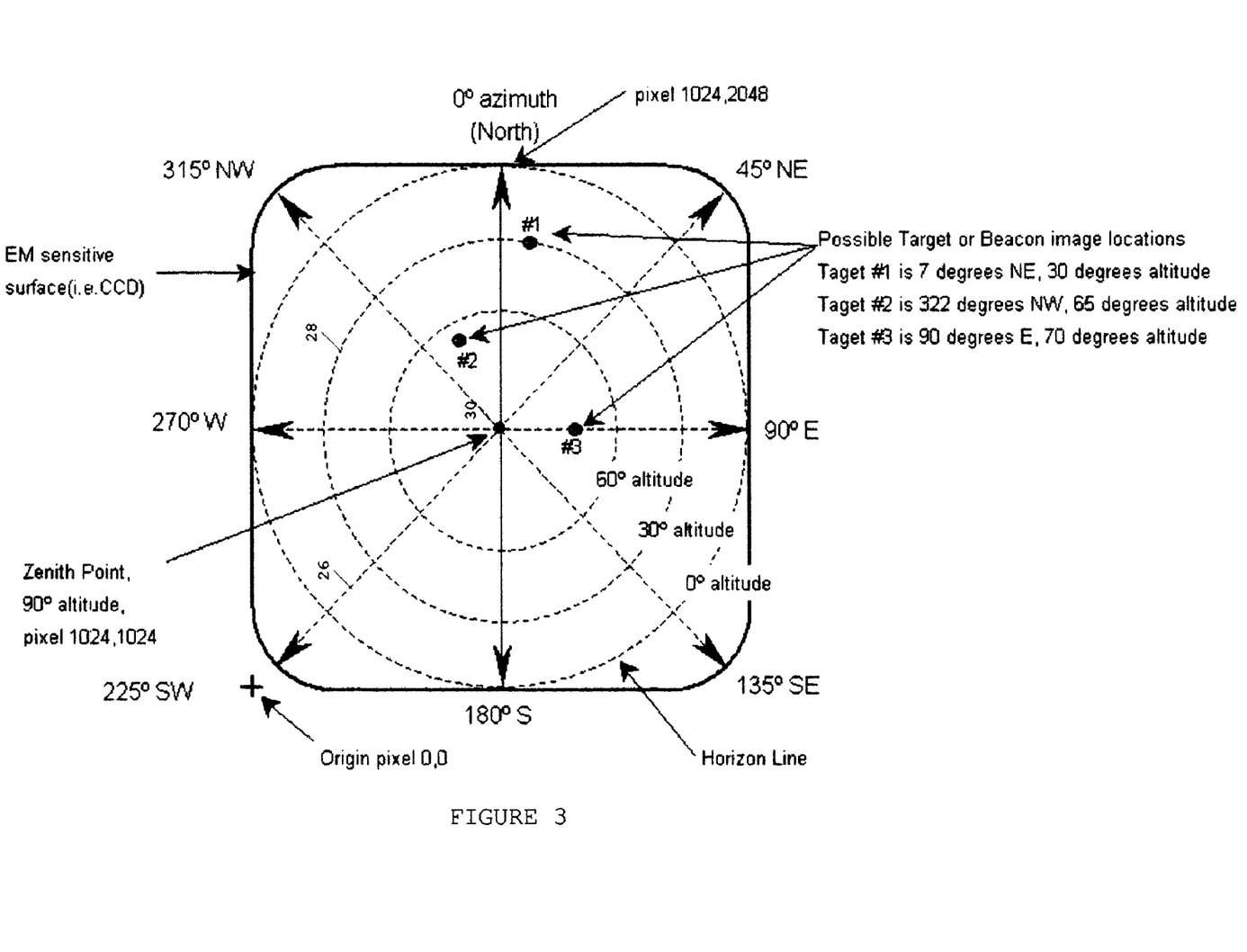
FIG. 3 is a perspective top view of an image sensor, preferably an optical sensor and more preferably a charged coupled device (CCD). This Figure also shows a possible memory mapping for the CCD.

FIG. 3 is a perspective top view of a single sensor, preferably, but not limited to, an optical sensor, and preferably, but not limited to, a CCD. This figure also shows how the memory mapping works for the, e.g., CCD. The square shown in FIG. 3 represents the light sensitive area of the image sensor. Someone familiar with CCD-type devices will understand that there are thousands of light-sensitive pixels, each with its own unique memory address. Because the very nature of a CCD is such that incident light from target or beacon 14 image activates these pixels, and because of the configuration outlined in FIG. 1, the received images will strike pixels which can be inherently correlated with a location in the sky, and which each have an associated "pixel coordinate" inherently represented in bits of data. In particular, each pixel is assigned a unique azimuth and elevation value, and the mere reception of a signal on a given pixel directly correlates to an indication that target or beacon 14 resides at the associated azimuth and elevation.

In this way, the foundation for the calculation set forth above is laid by the fact that each sensor comprises a two-dimensional plurality of discrete detection pixels; and by providing computerized data associating each said detection pixel with a predetermined azimuth angle and a predetermined elevation angle; wherein: when a target or beacon is detected by a given pixel of said sensor, an azimuth angle and an elevation angle of said target or beacon is automatically determined from said computerized data.

Figure 9:
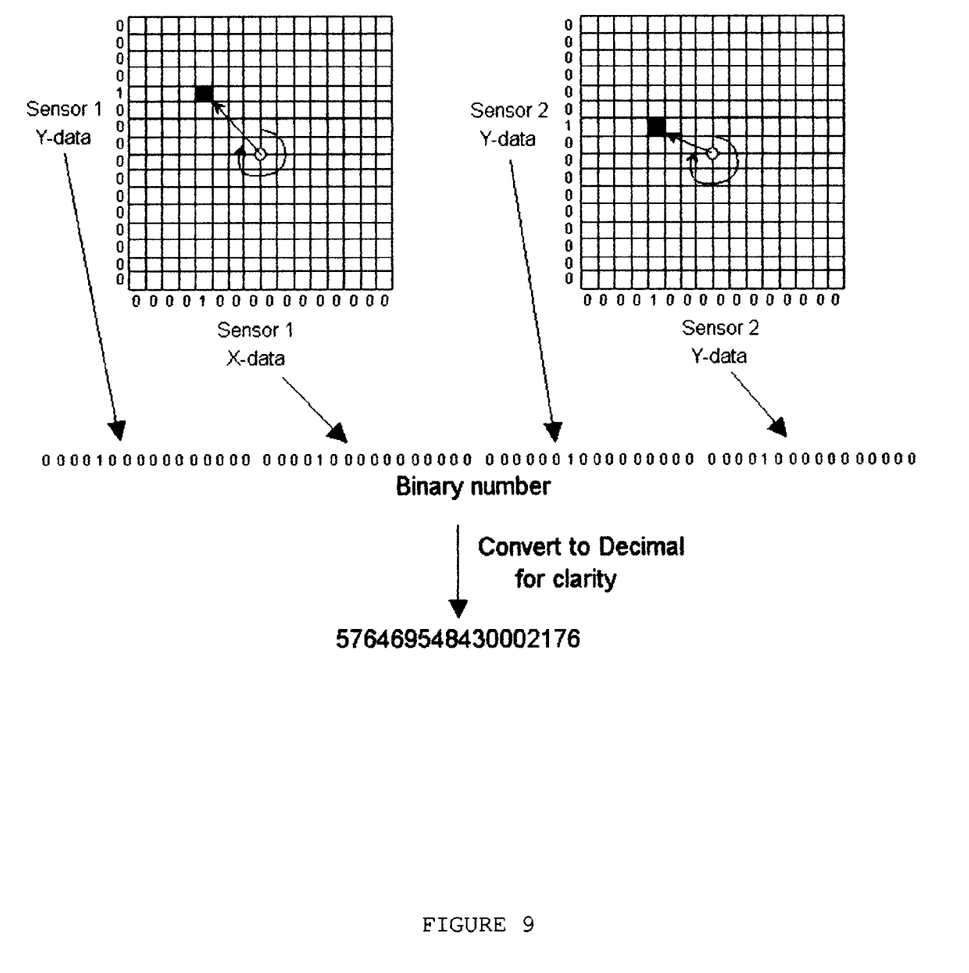
FIG. 9 is a perspective top view of a system memory configuration which is very resource intensive, and thus not preferred and illustrative only.

Referring now to FIG. 9, it is conceivable that the data bytes generated from the CCDs output could correlate to a computerized storage location. The binary data obtained from a unique CCD pixel can be used as an indexed address for a unique storage location. In this storage location is a pre-calculated value of X-Y-Z coordinates based on a preset distance "D" 40 between sensors. However, this approach is very storage intensive. As can be seen in FIG. 9, two sensors with only 16 bit-square area will consume extremely large amounts of storage in order to be able to identify every possible object location. Two 4 megapixel CCDs would need to have 17 terabytes of storage for each 2 pixel combination.

Figure 10:
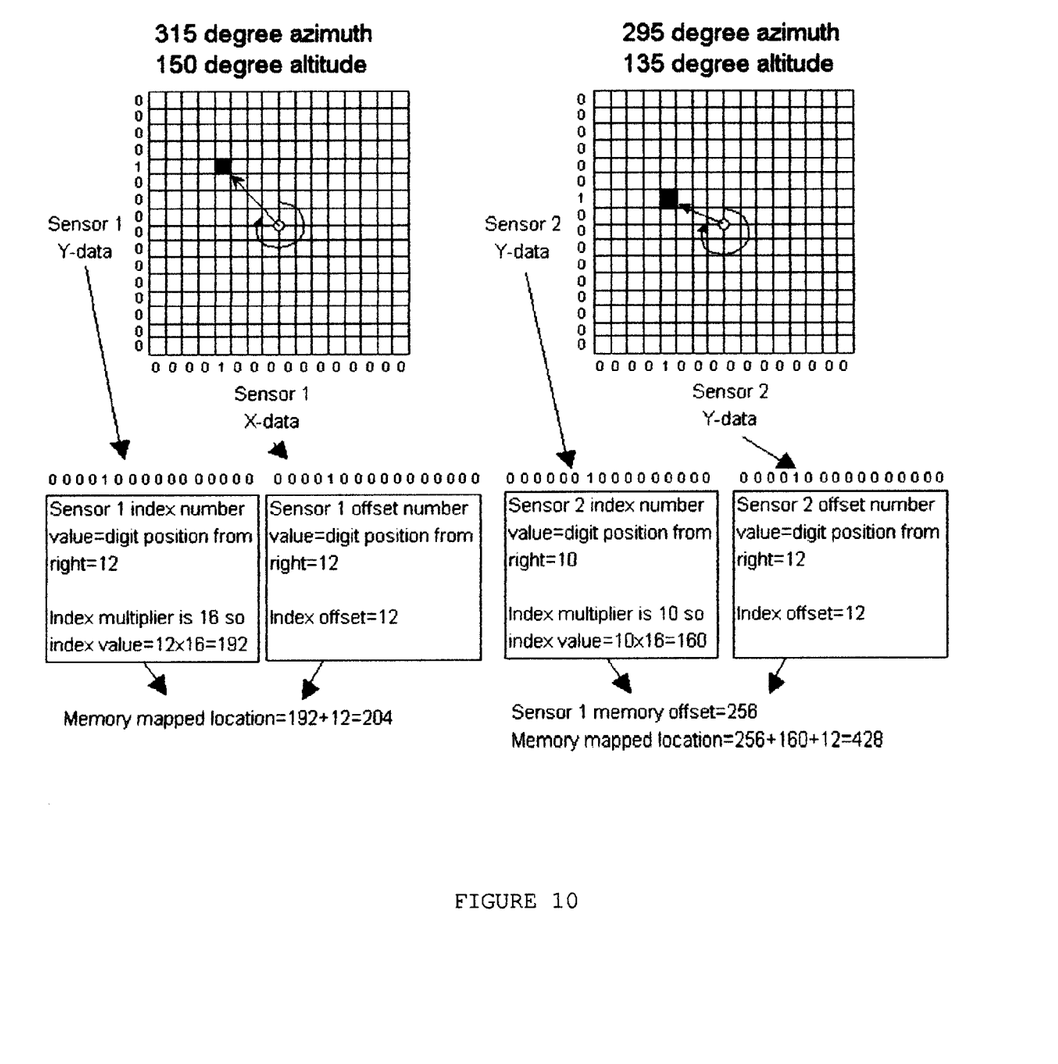
FIG. 10 is a perspective view, for example not limitation, of a possible system memory configuration.

FIG. 10 illustrates a preferred system storage configuration. This approach employs a table lookup for the azimuth and elevation angle for each sensor using indexed addressing. This only requires 4,194,304 storage locations for each 4 megapixel sensor. As can be seen in FIG. 10, one sensor axis number is an index value and the other sensor axis number is an offset. Using these values, a unique storage location can be located for this pixel. In this unique location would be stored the azimuth and elevation angle for this pixel as indicated by the azimuth and elevations lines in FIG. 3. Also note that the Zenith Point 30 is in the center of the sensor area indicating a target directly overhead. Once the azimuth and elevation information is known for both sensors, the calculation for the X-Y-Z coordinates can be accomplished as described above.

Someone of ordinary skill may, however, choose from a broad range of storage configurations, all within the scope of this disclosure and its associated claims. The key is that there be computerized data associating each detection pixel with a predetermined azimuth angle and a predetermined elevation angle, irrespective of the particular scheme that is chosen for storing this data.

Repeatable assembly of the sensors is also important. It can be concluded from FIG. 3 that alignment of the novel fish eye lens and the CCD should be completed precisely and repeatably such that the 0 degree azimuth line always encompasses the same set of pixels. With, for example, pixel 0,0 being in the lower left, the 0 degree azimuth line would be pixel coordinates from the center pixel (1024, 1024) to the center-top (1024, 2048). With a repeatable assembly, one calibration may be used on all identical assemblies. This calibration requires identifying the azimuth and elevation angle for each pixel in the sensor.

One technique for calibrating the system—for example, not limitation—is to place the sensor in a dark room with a reflective ceiling. A laser light can be shined on the ceiling at a known angle of elevation and azimuth. The memory-mapped location for the excited pixel is then assigned the known angles of azimuth and elevation loaded there. A series of reference points are mapped in this manner. All of the data in between the reference points is interpolated from the reference points. This database only needs to be established one time and once acquired it can be reused for all equivalent assemblies. The data base is stored in a lookup table in the system processor.

More generally, sensor calibration comprises the steps of: striking the sensor or an equivalent sensor with calibration electromagnetic radiation originating at known azimuth and elevation angles; determining which detection pixels of the sensor are activated by the calibration electromagnetic radiation; and associating the activated detection pixels with the known azimuth and elevation angles.

Figure 4:
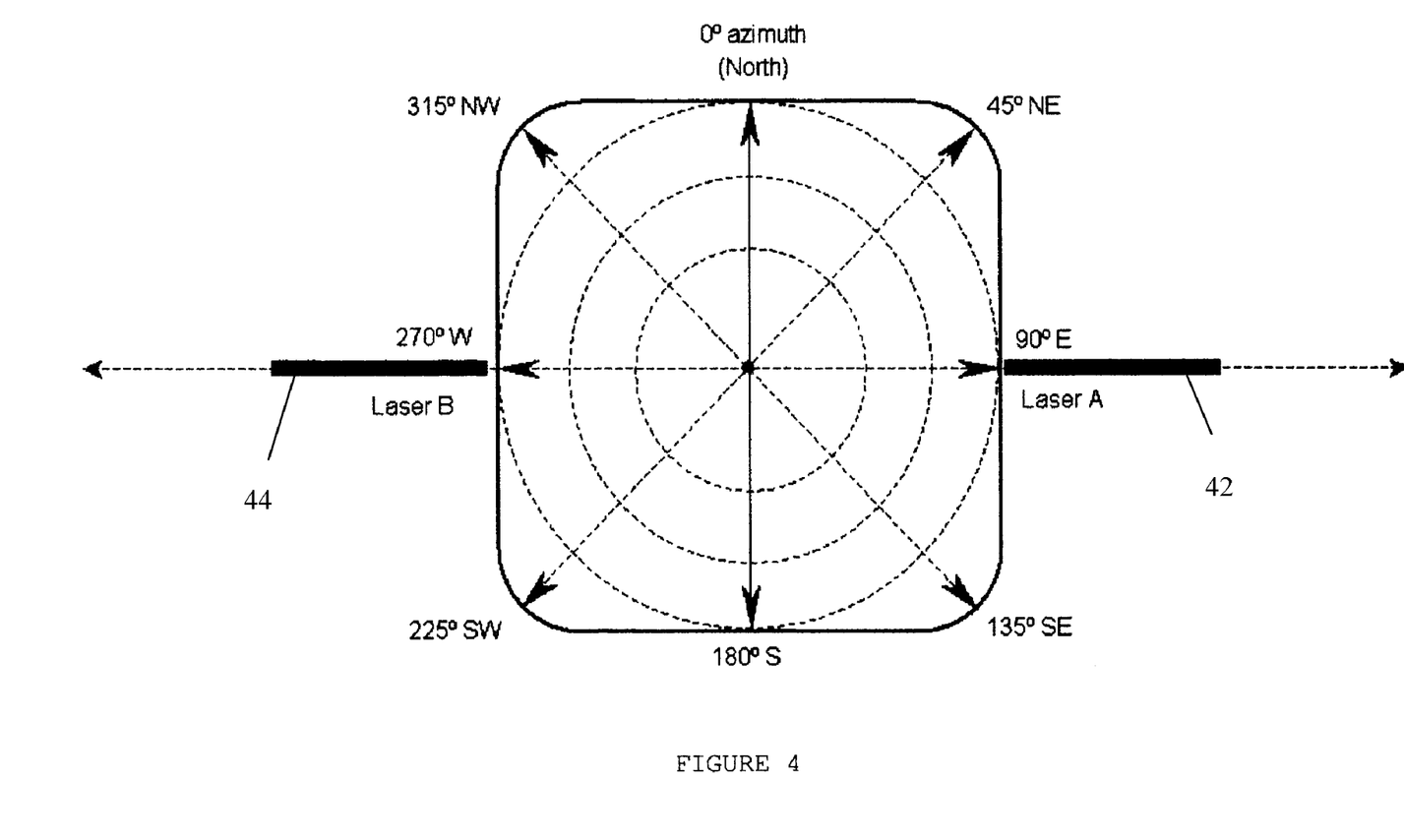
FIG. 4 is a perspective view of an advanced image sensor with self-calibration via, e.g., laser and/or GPS.

Referring now to FIG. 4, it is also important to employ an accurate alignment method for the sensors. That is, it is necessary to establish a known relative orientation between each of the sensors. A preferred way to accomplish this is to attach 2 lasers collinear with the 90 degree and 270 degree azimuth directions in addition to a GPS locator for each sensor. This allows the sensors to know their exact orientation with respect to each other and with respect to an external frame of reference. A technique for accomplishing this is to use the same room with reflective ceiling as described in the calibration phase above. First laser A 42 and second laser B 44 is mounted on the base of the sensor. Laser A 42 points on the reflective surface at a 90 degree azimuth and laser B 44 points at the reflective surface at a 270 degree azimuth. As each laser point is rotated on the ceiling from the horizon to the zenith, the corresponding pixels in the sensor are activated. Once the correct azimuth line is acquired, the laser is fixed in that azimuth plane. One of these lasers, preferably, is also used to measure distance using light pulse time delay—a technology which is already known in the art for measuring distances and thus will not be described here.

Once in the field, the two sensors are aligned by setting a distance between the lasers. For most practical situations, it is desirable to separate the sensors by at least 50 feet for the system to be able to track properly. If the sensors are too close together, there will not be a measurable difference between the active pixels on each sensor. The two sensor are positioned at a height above any moving objects that might enter into the active view filed of the sensors, and leveled with, e.g., a bubble level. Fifteen feet should be sufficient in a typical military camp, though it is recognized that this height may vary depending on situation. Left sensor 10 is rotated such that Laser A 42 hits center mass of right sensor 12. Left sensor 10 also pulses Laser A 42 and measures the time of the reflection for accurate distance measurement. Right sensor 12 is rotated such that Laser B 44 hits center mass of left sensor 10. Now the sensors are ready to measure targets. This establishes a known distance between the sensors.

Figure 5:
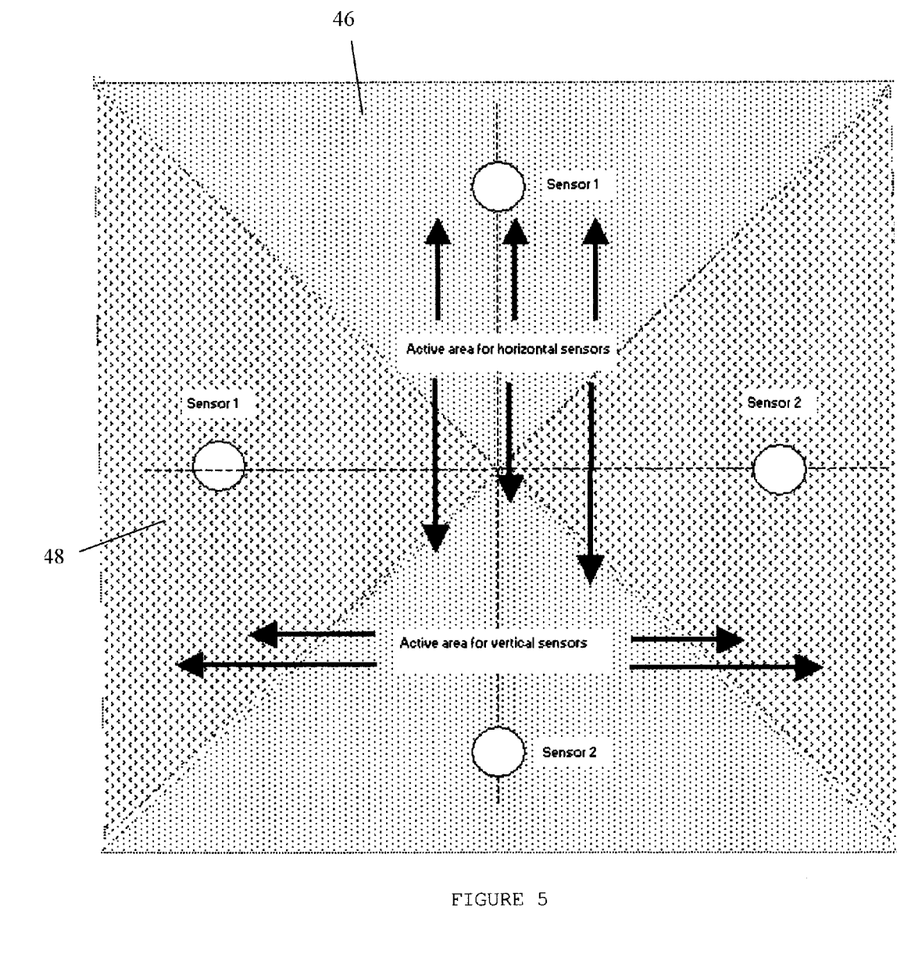
FIG. 5 is a perspective top view of a 4 sensor array in an alternative preferred embodiment.

Referring now to FIG. 5, well as earlier equations 1-12, it will be observed that the mathematical formulas for calculating in this system employ the tangent function. Because of this, if the target approaches at 90 degrees or 270 degrees azimuth the calculation becomes invalid because the tangent function is undefined at these angles. The way to overcome this issue is to have two sets of two sensors each, at right angles to each other. For example, in FIG. 5 the horizontal pair is used for targets whose azimuth angles are the range of 315 to 45 degrees and 135 to 225 degrees as identified by the horizontal pair sensor area 46. The vertical pair would be used for targets whose azimuth angles are 45 to 135 degrees and 225 to 315 degrees as identified by the vertical pair sensor area 48. Both systems run independently and in unison. However, if the target trajectory is within approximately one (1) degree of being collinear with either sensory axis, its data must be disregarded because of this tangent function anomaly.

A simpler variation of the system might employ, for example, 3 sensors in a triangle. In this formation, all three sensors would track data. Only data from the two closest sensors are be used to calculate target position. The two closest sensors are the two with the largest elevation angles.

More generally, such a system comprises at least one additional sensor substantially equivalent to each of the sensors in a two-sensor configuration and comprising substantially equivalent computerized data therefor; and computerized means for calculating the three-dimensional position of the target or beacon, based on azimuth angles and elevation angles of said target or beacon for a selected pair of sensors, and based on a known distance and relative orientation between the selected pair of sensors.

Figure 6:
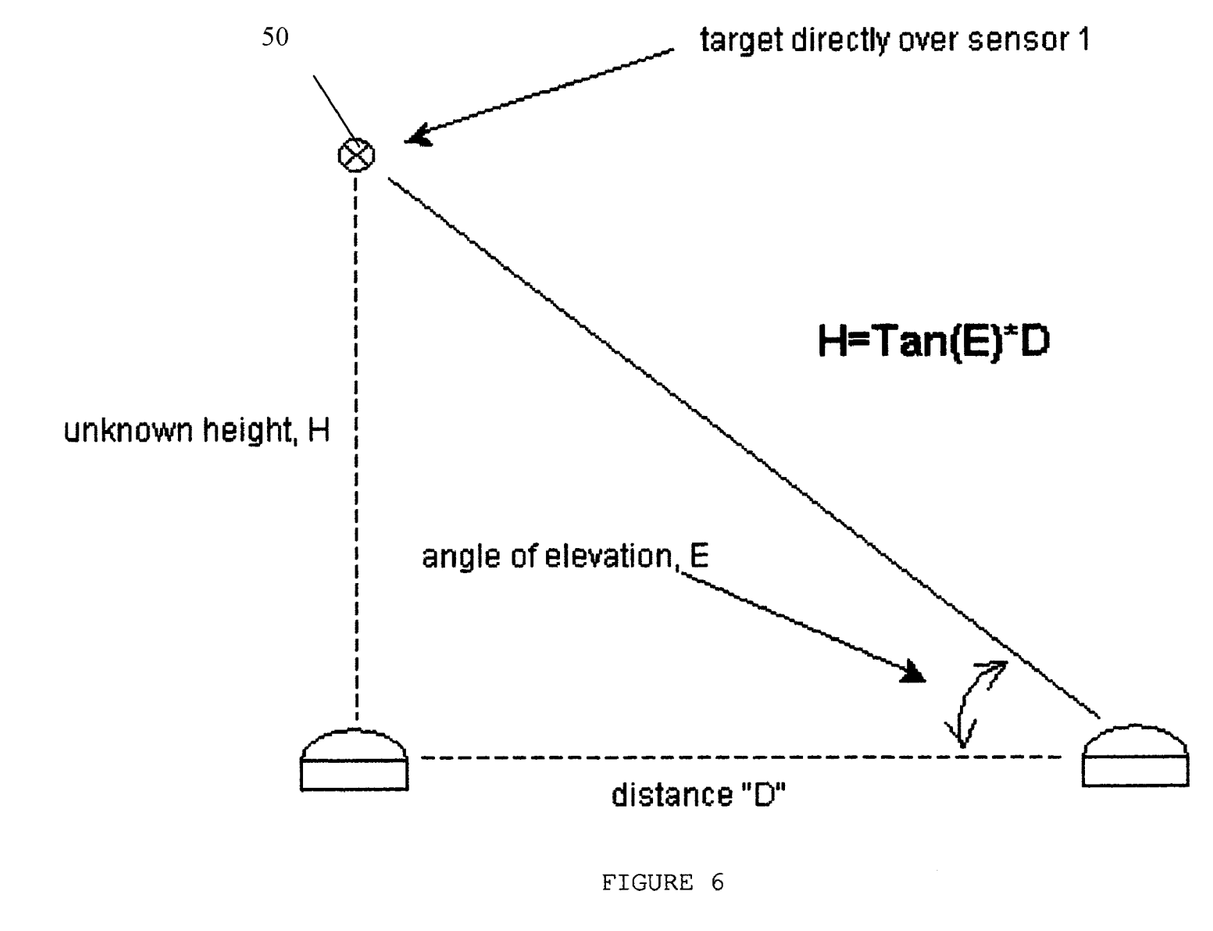
FIG. 6 is a rear view of a situation in which a target is directly over the zenith of the left sensor (sensor 1).

Referring now to FIG. 6, it is observed that the tangent anomaly is not an issue with the elevation parameter. The only exception would be if there was a target-over-zenith situation as depicted in FIG. 6. In this case the X is equal to the distance between the sensors and the height H=Tan E2*D, so location may still be accurately calculated.

If multiple targets enter the sensory area, each target is given its own identification. This identification is associated with the target's trajectory data in order to differentiate its data for coordinate calculation. Multiple targets are not an issue if this system is used for navigation. While mounted on a vehicle, the system will only track a stationary homing beacon for navigation. If used in conjunction with optical edge recognition type software, this program will identify the exact location of the edges of objects in the vehicle's path and allow for easier auto-navigation.

It is also noted that the data from this system can be converted into polar or GPS coordinates if desired.

While only certain preferred features of the invention have been illustrated and described, many modifications and changes will occur to those skilled in the art. It is, therefore, to be understood that the appended claims are intended to cover all such modifications and changes as fall within the true spirit of the invention.

I claim:

1. A sensor system for tracking and navigation, comprising:
    two sensors, each sensor comprising a two-dimensional plurality of discrete detection pixels;
    for each said sensor, computerized data associating each said detection pixel thereof with a predetermined azimuth angle and a predetermined elevation angle;
    a computerized device for automatically determining azimuth angles and elevation angles of electro-magnetic radiation from a target or beacon simultaneously detected by each of said sensors, for each of said sensors, based on said computerized data; and
    said sensor system omitting means for focusing a spot of electro-magnetic radiation onto said target or beacon to be so-detected.

2. The system of claim 1, further comprising:
    said computerized device for further calculating a three-dimensional position of said target or beacon, based on said azimuth angles and said elevation angles of said target or beacon for each of said sensors, and based on a known distance and relative orientation between each of said sensors.

3. The system of claim 1, wherein:
    said computerized data is established for each sensor from detecting electromagnetic radiation at known azimuth and elevation angles with said sensor or an equivalent sensor and determining which pixels are activated thereby.

4. The system of claim 3, wherein:
    said computerized data, for each sensor, associates the activated detection pixels with said known azimuth and elevation angles.

5. The system of claim 1, wherein:
    said azimuth angle and elevation angle are automatically determined for each sensor to be the azimuth angle and elevation angle associated with said given pixel by said computerized data.

6. The system of claim 1, said computerized data comprising a computerized lookup table for each sensor, associating each said detection pixel with said predetermined azimuth angle and said predetermined elevation angle.

7. The system of claim 1, further comprising:
    at least one additional sensor substantially equivalent to each of said two sensors and comprising substantially equivalent computerized data therefor; and
    said computerized device for further calculating said three-dimensional position of said target or beacon, based on azimuth angles and elevation angles of said target or beacon for a selected pair of said sensors, and based on a known distance and relative orientation between said selected pair of said sensors.

8. The system of claim 7, further comprising said computerized device for further using said azimuth angles and elevation angles from less than all of said sensors, when one or both of said azimuth angles and elevation angles are undefined.

9. The system of claim 1, further comprising:
    said computerized device for further calculating an origin of said target based on calculations of said three-dimensional position at least two distinct times.

10. The system of claim 1, further comprising:
    said computerized device for further calculating a destination of said target based on calculations of said three-dimensional position at least two distinct times.

11. A sensor system for tracking and navigation, comprising:
    a sensor comprising a two-dimensional plurality of discrete detection pixels; and
    computerized data associating each said detection pixel with a predetermined azimuth angle and a predetermined elevation angle; wherein:
    when electro-magnetic radiation from a target or beacon is detected by a given pixel of said sensor, an azimuth angle and an elevation angle of said target or beacon is automatically determined from said computerized data; and
    said sensor system omitting means for focusing a spot of electro-magnetic radiation onto said target or beacon to be so-detected.

12. The system of claim 11, wherein:
    said computerized data is established from detecting electromagnetic radiation at known azimuth and elevation angles with said sensor or an equivalent sensor and determining which pixels are activated thereby.

13. The system of claim 11, wherein:
    said azimuth angle and elevation angle are automatically determined to be the azimuth angle and elevation angle associated with said given pixel by said computerized data.

14. The system of claim 11, said computerized data comprising a computerized lookup table associating each said detection pixel with said predetermined azimuth angle and said predetermined elevation angle.

15. A method for tracking and navigation, comprising:

placing two sensors at a known distance and with a known orientation relative to one another, each sensor comprising a two-dimensional plurality of discrete detection pixels;

simultaneously detecting electro-magnetic radiation from a target or beacon with each of said sensors; and automatically determining azimuth angles and elevation angles of a target or beacon simultaneously detected by each of said sensors, for each of said sensors, based on which detection pixels of each sensor are activated by detecting said target or beacon, using computerized data associating each said detection pixel thereof, for each sensor, with a predetermined azimuth angle and a predetermined elevation angle; and said method omitting focusing a spot of electro-magnetic radiation onto said target or beacon for said detecting.

16. The method of claim 15, further comprising:

calculating a three-dimensional position of said target or beacon, based on said azimuth angles and said elevation angles of said target or beacon for each of said sensors, and based on said known distance and relative orientation between each of said sensors.

17. The method of claim 15, further comprising:

establishing said computerized data for each sensor by detecting electromagnetic radiation at known azimuth and elevation angles with said sensor or an equivalent sensor and determining which pixels are activated thereby.

18. The method of claim 17, further comprising:

for each sensor, associating the activated detection pixels with said known azimuth and elevation angles.

19. The method of claim 15, further comprising:

automatically determining said azimuth angle and elevation angle for each sensor to be the azimuth angle and elevation angle associated with said given pixel by said computerized data.

20. The method of claim 15, further comprising:

for each sensor, associating each said detection pixel with said predetermined azimuth angle and said predetermined elevation angle, using a computerized lookup table.

21. The method of claim 15, further comprising:

placing at least one additional sensor substantially equivalent to each of said two sensors and comprising substantially equivalent computerized data therefor, at a known distance and with a known orientation relative to said two sensors; and calculating said three-dimensional position of said target or beacon, based on azimuth angles and elevation angles of said target or beacon for a selected pair of said sensors, and based on the known distance and relative orientation between said selected pair of said sensors.

22. The method of claim 21, further comprising:

using said azimuth angles and elevation angles from less than all of said sensors, when one or both of said azimuth angles and elevation angles are undefined.

23. The method of claim 15, further comprising:

calculating an origin of said target based on calculations of said three-dimensional position at least two distinct times.

24. The method of claim 15, further comprising:

calculating a destination of said target based on calculations of said three-dimensional position at least two distinct times.

25. A method for tracking and navigation, comprising:

associating each detection pixel of a sensor comprising a two-dimensional plurality of discrete detection pixels, with a predetermined azimuth angle and a predetermined elevation angle; wherein:

when electro-magnetic radiation from a target or beacon is detected by a given pixel of said sensor, automatically determining an azimuth angle and an elevation angle of said target or beacon from said computerized data;

said method omitting focusing a spot of electro-magnetic radiation onto said target or beacon for said detecting.

26. The method of claim 25, further comprising:

associating said each detection pixel with said azimuth angle and elevation angle by detecting electromagnetic radiation at known azimuth and elevation angles with said sensor or an equivalent sensor and determining which pixels are activated thereby.

27. The method of claim 25, further comprising:

automatically determining said azimuth angle and elevation angle from the azimuth angle and elevation angle associated with said given pixel by said computerized data.

28. The system of claim 25, said automatically determining further comprising automatically looking up said predetermined azimuth angle and said predetermined elevation angle associated with said given pixel, in a computerized lookup table.

* * * * *